July 4, 1961 J. C. MAYS 2,991,057
FUEL SUPPLY MEANS FOR INTERNAL COMBUSTION ENGINE
Filed June 5, 1957 2 Sheets-Sheet 1
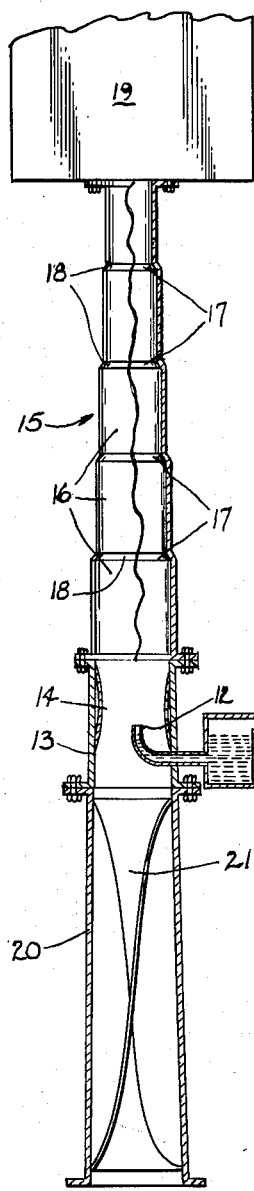
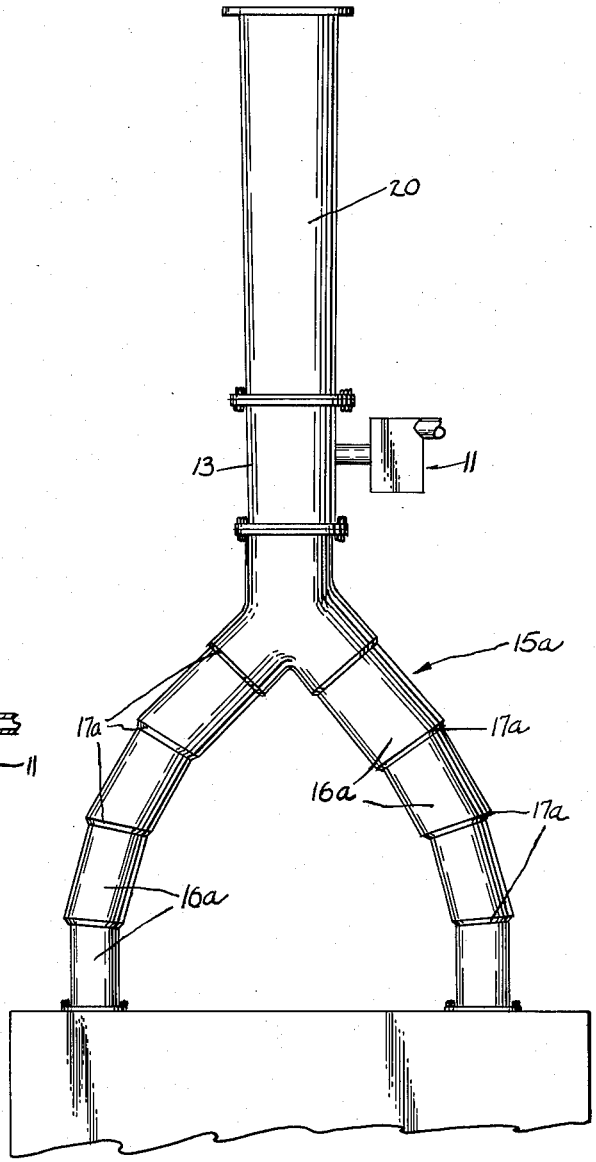
INVENTOR.
JOHN C. MAYS
BY
Kegan and Kegan
ATT'YS.

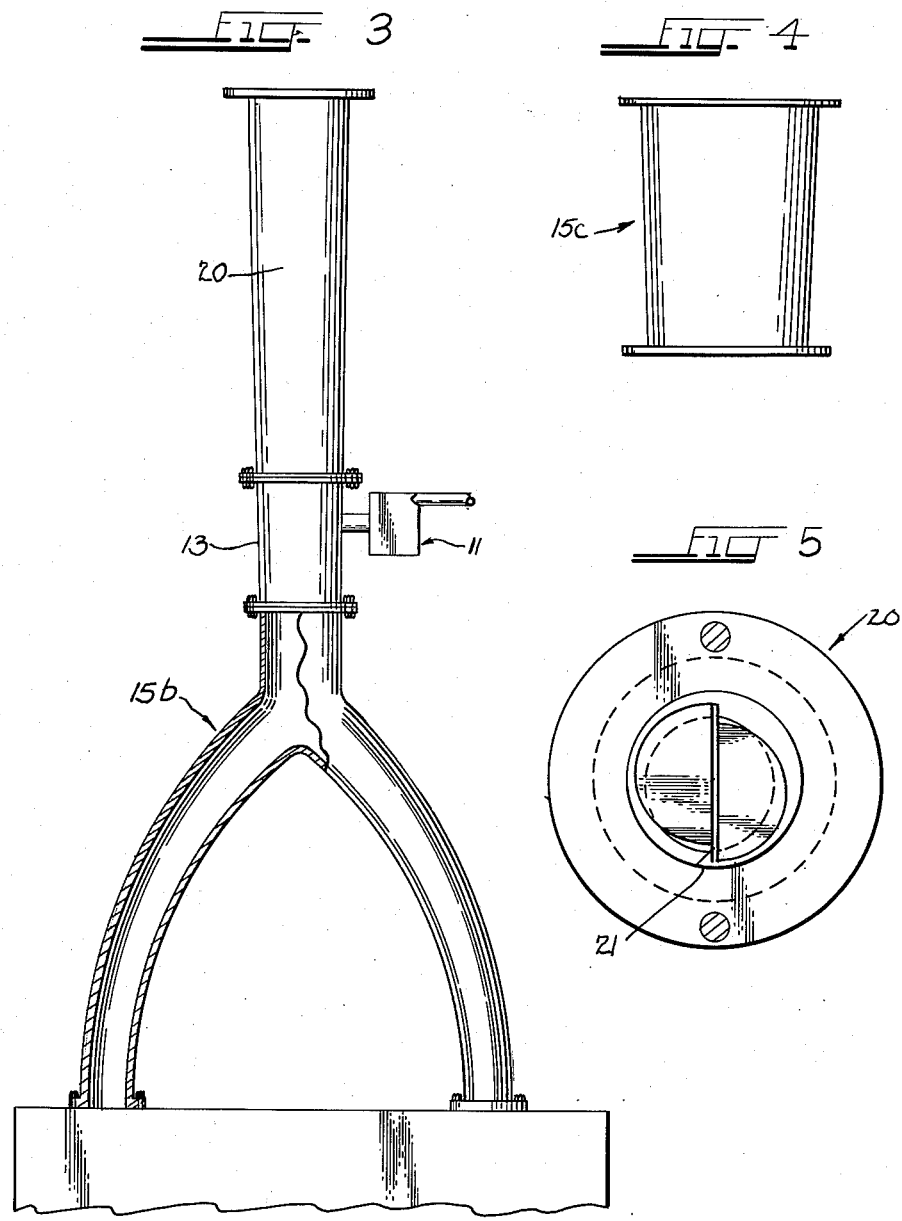

United States Patent Office 2,991,057
Patented July 4, 1961

2,991,057
FUEL SUPPLY MEANS FOR INTERNAL
COMBUSTION ENGINE
John C. Mays, Box 53, Towanda, Ill.
Filed June 5, 1957, Ser. No. 663,649
7 Claims. (Cl. 261—76)

This invention relates to internal combustion engines; to improved supply means for conducting fuel mixtures thereto; and, more particularly to a novel manifold construction which promotes homogeneity and vaporization of the fuel mixture fed to the engine intake ports as well as aiding in the charging thereof.

The efficiency of the herein manifold and the uniformity and equality of the air-fuel mixture, together with the flow thereof, is further enhanced by a novel stack structure which so directs and distributes the flow of said mixture within the manifold as to achieve an improved intimate gaseous mix of the charge drawn into the engine. Homogeneity and vaporization of the charge, moreover, are accomplished without the use of either superheater jackets or moving mechanical choppers.

It further is within the contemplation of the present invention to provide the herein manifold construction for use in conjunction with, or as a continuation of, or as a part of the engine's fuel supply system, such as a carburetor.

In the usual carburetor system, liquid fuel is introduced into a flow of air. However, only a portion of fuel generally is vaporized while the remainder is carried along through the intake manifold as liquid particles. Eventually these particles tend to collect on the manifold inner wall as a liquid film, and, accordingly the richness of the mixture introduced to the engine may vary. Among the means commonly used to achieve complete vaporization of the liquid fuel particles, there are forms of superheaters which heat the manifold to insure that all the fuel is vaporized. This, however, greatly decreases the weight of the mixture introduced to the engine's combustion chamber, since the hotter gaseous mixture has a greater volume. As a consequence, while fuel consumption is reduced, undesirably the engine's power is reduced.

In contrast, the present invention provides means for achieving vaporization of the engine's charge while increasing the engine's power through the supply of a dense gaseous mix ready for combustion.

A principal object of this invention is to provide improved means for preparing and integrating mixtures of air and fuel into gaseous form in readiness for introduction into an internal combustion engine.

In carrying out this provision, a novel intake manifold construction is contemplated, which construction provides a path of decreasing size in which the air-fuel mixture or engine charge flows at coresponding increasing velocities, thereby to aid charging of the engine. In its preferred form the manifold includes a series of sections of decreasing cross-sectional area, the sharp reductions in area and junctions between adjacent sections providing shoulders which serve to agitate, grind and break up the liquid fuel particles carried by the mixture, and thereby reduce the fuel particles to such size that they become, in effect, vaporized. A novel velocity stack may be used in combination with the manifold to increase the velocity of the mixture directed thereto. The stack further is provided with a stationary blade so arranged as to direct the fuel mixture centrifugally against the inner wall and shoulders of the manifold to increase the efficiency of the breaking up or vaporization action on the liquid fuel particles.

Thus, the present invention provides a simple means for effecting both intimate mixing and thorough vaporization of a charge prior to the same being introduced into an engine's combustion chamber.

These and other objects, advantages and features of construction will become more apparent upon a consideration of the following description and the accompanying drawings.

In the drawings:
FIGURE 1 illustrates an assembly view, partly in section, of one embodiment incorporating the present invention;
FIGURE 2 is a view of another assembly of apparatus adapted to carry out the present invention;
FIGURE 3 is a view of apparatus similar to that shown in FIGURE 2, illustrating another embodiment thereof;
FIGURE 4 is a view of a manifold adapted for single port carburation and embodying the principles of the manifold shown in FIGURE 3; and
FIGURE 5 is an end view of the velocity stack shown in FIGURE 1.

Referring in particular to FIGURE 1, a carburetor 11 is used to spray fuel through a nozzle 12 and into a stream of air traveling through a passage 13 which may be provided with a restriction 14 to promote fuel injection. The particular type of fuel injection means employed forms no part of the present invention, and obviously other means may be employed for introducing the fuel into the air stream. A suitable throttle may be provided.

The fuel mixing and atomizing means of the present invention is provided along the air-fuel mixture passage succeeding the carburetor, and includes a manifold 15 the cross-sectional area of which, in the direction of mixture flow, decreases in size. In its preferred embodiment the manifold comprises a series of annular tube sections 16. For instance, as shown in FIGURE 1, five such sections are provided. In order, from carburetor 11, the sections 16 are of decreasing size, whereby the velocity of the mixture is increased as it passes through manifold 15. A series of annular tapered shoulders 17 are present within manifold 15 to deflect and direct mixture flow therethrough, the shoulders being formed at the junctions 18 adjacent sections 16.

As air flows through passage 13 it picks up fuel from carburetor 11. Part of the fuel, of course, is immediately vaporized by the carburetor. The remainder, however, enters passage 11 and is carried therealong as liquid particles. In manifold 15, the velocity of the air fuel mixture is increated as the same passes through the sections 16 of succeeding decreasing cross-sectional area. During their travel the liquid particles, further are impinged against the succeeding shoulders 17 which grind, agitate and break down the moving particles until they are in effect atomized. The gaseous homogeneous mixture leaving manifold 15 thus is conditioned for more nearly complete combustion within engine 19.

To increase the effect of the shoulders 17 on the air-fuel mixture, a velocity stack 20, also of gradually decreasing cross-sectional area, may be provided. Within stack 20 a stationary blade 21 is arranged with a twist so as to direct the passing air centrifugally against the walls of passage 13 and manifold 15. The spinning mixture, and especially the heavier liquid fuel particles, thereby is forced to follow closely the manifold inner wall whereat the particles are impelled against the annular tapered shoulders 17, broken up and in effect vaporized. The mixture thus is conditioned for more nearly complete combustion within the engine 19, wherein it enters in a rich dense gaseous form.

It will be apparent that in practice, and particularly with present day internal combustion engines having more than one cylinder, that a manifold such as that shown in FIGURE 2 is more readily adapted for use. In this embodiment of the invention, the manifold 15a is Y-shaped, and each leg is provided with a plurality of round tubular sections 16a. Annular shoulders 17a also are present in manifold 15a to break up liquid particles passing thereby. A carburetor 11 and stack 20, similar to those shown in FIGURE 1, also are employed.

FIGURES 3 and 4 show embodiments of the manifold structure also within contemplation of the present invention. These manifolds 15b and 15c, respectively, are shown as gradually tapering to a smaller cross-section, rather than having variably sized sections and pronounced deflectors to mixture flow. The gradually narrowing paths for the mixture to follow increase the velocity of the charge passing therethrough to the engine. Also, the narrowing paths have mixing, agitation and grinding value; although not as thoroughly as in the case of the stepped manifolds having sections of decreasing size. However, deflectors to mixture flow, such as those shown in FIGURES 1 and 2, also may be provided in the manifolds shown in FIGURES 3 and 4, if desired. A velocity stack 20 having a stationary blade 21 may be used with the manifolds shown in FIGURES 3 and 4; although the use of such structure is preferred with a manifold of stepped construction or one having deflecting shoulders.

To illustrate the relative size of the stepped sections 16 or 16a, one particular embodiment of the invention employed sections, in order of decreasing diametral size, as follows: 1.230, 1.195, 1.170, 1.125 and 1.095 inches. After the latter, the mixture is directed into the engine's port, which is approximately 1.250 inches in diameter. The air-fuel mixture thus is churned and broken up in the manifold, as it passes therethrough, into a homogeneous gaseous mixture ready for introduction to the engine. Since no extraneous heat is applied, the mixture, moreover, is rich and dense with thoroughly vaporized fuel.

In regards to the stack 20, one embodiment thereof tapers from a diameter of one and one-half inches to one and three-eighths inches over a distance of six inches, during which time the blade 21 is so arranged that the air passing thereby makes one-half a revolution during its travel within the stack. Further travel of the air and fuel mixture through passage 13 is along a two inch path reduced from a diameter of one and three-eighths inches to 1.230 inches in readiness for entering the manifold.

It thus is seen that the successive reductions in diameter in both the stack and the manifold may be fairly small. It is to be understood, of course, that the diametrical reductions in the manifold vary according to manifold size which varies according to the displacement of the particular engine with which the manifold is used.

Experience, however, has shown that best results are achieved by a long manifold having the following: approximately five inches in length for each inch in diameter; a fairly small diameter to maintain reasonably high mixture velocities; and a taper of about twenty percent in diameter to promote velocity increases. Further, it has been found that a series of small diametral reductions achieves better results than one or two larger reductions.

An essential feature of the stepped multisection manifold is that it presents a series of deflectors to mixture flow, which deflectors thus serve to break up any liquid fuel carried along in the flow and to churn the entire mixture into a homogeneous gaseous product ready for highly efficient combustion within the engine. It should be understood, of course, that the deflectors also may be provided in a tapering manifold, or, in fact, any manifold structure in which it is desired to break up the liquid fuel particles and achieve a more homogeneous gaseous mixture.

Although what have been shown and described are preferred embodiments of the invention, it is understood that the herein embodiments are not intended to be exhaustive nor limiting the invention, but instead are given for the purpose of illustration, and that others skilled in the art may be able to modify and adapt it in various forms without departing from the spirit thereof, the scope of which is defined in the appended claims.

What is claimed is:

1. Apparatus for providing an intimate gaseous mixture of air and fuel and directing the same towards an internal combustion engine, comprising means for metering fuel into an air stream, duct means providing a passage including a series of tubular sections of successively decreasing size through which said stream and fuel flow at successively increasing velocities, and stationary means for directing flow along the inner wall of said passage, each said section succeeding the first beginning abruptly at the end of the preceding section and proceeding smoothly to its own end thereby providing a series of internal shoulders of successively decreasing size circumscribing said passage at the junctions between adjacent sections, against which the liquid fuel particles collide, and are agitated, ground and vaporized during travel.

2. Means for effecting an intimate gaseous mixture of air and fuel in preparation of the same being introduced into an internal combustion engine, comprising: means for charging an air stream with a fuel spray, a tubular passage decreasing in cross sectional area along the path which said stream passes, a twisted blade for spinning the air stream against the inner wall of said passage, and a series of deflectors on the passage inner wall, spaced along the path of stream flow, and against which the heavy liquid fuel particles are thrust, broken up, and effectively vaporized during their travel therethrough, the inner wall of the passage following any said deflector being a continuation of the inner edge of that deflector to preclude the stream from eddying directly behind the deflectors.

3. Apparatus for effecting an intimate gaseous mixture of air and liquid fuel, comprising a carburetor for introducing fuel into an air stream, a tubular passage including along the path of air stream travel a series of successively smaller annular sections through which the air-fuel mixture passes at correspondingly higher velocities, a tapering velocity stack located before said passage and having a stationary twisted blade therein for directing mixture flow against the inner wall of said passage, each said section being substantially uniform in inner diameter, the said sections being joined end-to-end to provide a series of successively smaller throats which are joined by a series of abutments directly behind which the stream is prevented from eddying.

4. Fuel supply means for an internal combustion engine, comprising metering means for introducing a spray of fuel into an air stream, a tubular passage through which the air-fuel mixture passes, a stationary twisted blade arranged to centrifugally direct the mixture to follow a path along the passage inner wall, the inner wall of the passage diminishing in diameter through a series of steps with the reduced diameter at each step continuing to the next step.

5. A manifold for supplying a mixture of air and fuel to an internal combustion engine from structure whereat liquid fuel is sprayed into an air stream to provide said mixture, comprising wall means defining a passage through which the said mixture is supplied and defining a series of shoulders each of which extends substantially entirely around the passage, the passage being divided by said shoulders into a series of generally aligned passage sections, both the shoulders and the passage sections successively decreasing in size along the direction of flow of the said mixture, each passage section disposed between adjacent ones of said shoulders continuing from the rim of the upstream shoulder to the base of the downstream shoulder at substantially the size defined by the rim of the upstream shoulder to avoid inter-shoulder velocity loss.

6. Means for supplying an homogeneous gaseous mixture of air and fuel to an internal combustion engine, comprising means for spraying fuel into an air stream, a tubular passage, including a plurality of tubular sections of successively decreasing size, with each section being of the same internal size throughout, the sections being joined at a series of inward steps in said passage at the junctions of adjacent sections, and against which liquid fuel particles are impelled, correspondingly reduced in size, and intimately mixed.

7. A fuel supply system for an internal combustion engine, comprising an air intake, a twisted deflector therein arranged to impart centrifugal spin to the air stream passing therethrough, means for introducing fuel to said air stream, a conduit leading said air stream beyond the said air intake and the said means for introducing fuel, said conduit including a series of sections which, in the direction of air stream flow, are of consecutively smaller size, and shoulders facing upstream in said conduit at the junction between adjacent sections for causing turbulence to the air stream flow and against which liquid fuel particles are impelled and broken up, each section following a said shoulder comprising means preventing eddying of the stream directly behind such shoulder.

References Cited in the file of this patent

UNITED STATES PATENTS

| | | |
|---|---|---|
| 992,260 | Rush | May 16, 1911 |
| 1,099,086 | Hamilton | June 2, 1914 |
| 1,256,738 | Smith | Feb. 19, 1918 |
| 1,475,556 | Horning | Nov. 27, 1923 |
| 1,600,007 | Mock | Sept. 14, 1926 |
| 1,818,283 | Spencer | Aug. 11, 1931 |
| 1,901,763 | Moore | Mar. 14, 1933 |
| 1,957,561 | Timian | May 8, 1934 |
| 2,028,585 | Blake et al. | Jan. 21, 1936 |
| 2,699,216 | Allen | Jan. 11, 1955 |